Nov. 20, 1962  R. A. ARMER  3,064,416
PARKING METER AND TIME RELEASE STRUCTURE THEREFOR
Filed Nov. 12, 1958  4 Sheets-Sheet 1

INVENTOR.
Rollin A. Armer
BY
His Attorney

Nov. 20, 1962 R. A. ARMER 3,064,416
PARKING METER AND TIME RELEASE STRUCTURE THEREFOR
Filed Nov. 12, 1958 4 Sheets-Sheet 2
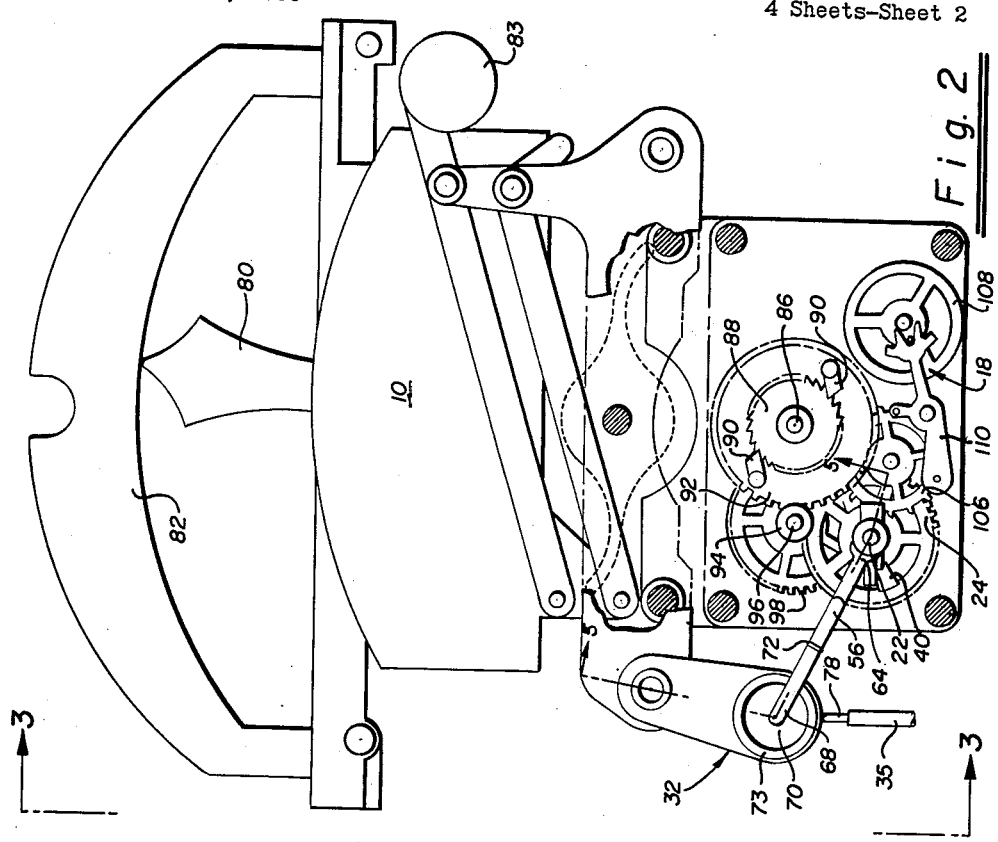
INVENTOR.
Rollin A. Armer
BY
Manfred M. Warren
His Attorney Nov. 20, 1962    R. A. ARMER    3,064,416
PARKING METER AND TIME RELEASE STRUCTURE THEREFOR
Filed Nov. 12, 1958    4 Sheets-Sheet 3

INVENTOR.
Rollin A. Armer
*His Attorney*

Nov. 20, 1962 R. A. ARMER 3,064,416
PARKING METER AND TIME RELEASE STRUCTURE THEREFOR
Filed Nov. 12, 1958 4 Sheets-Sheet 4
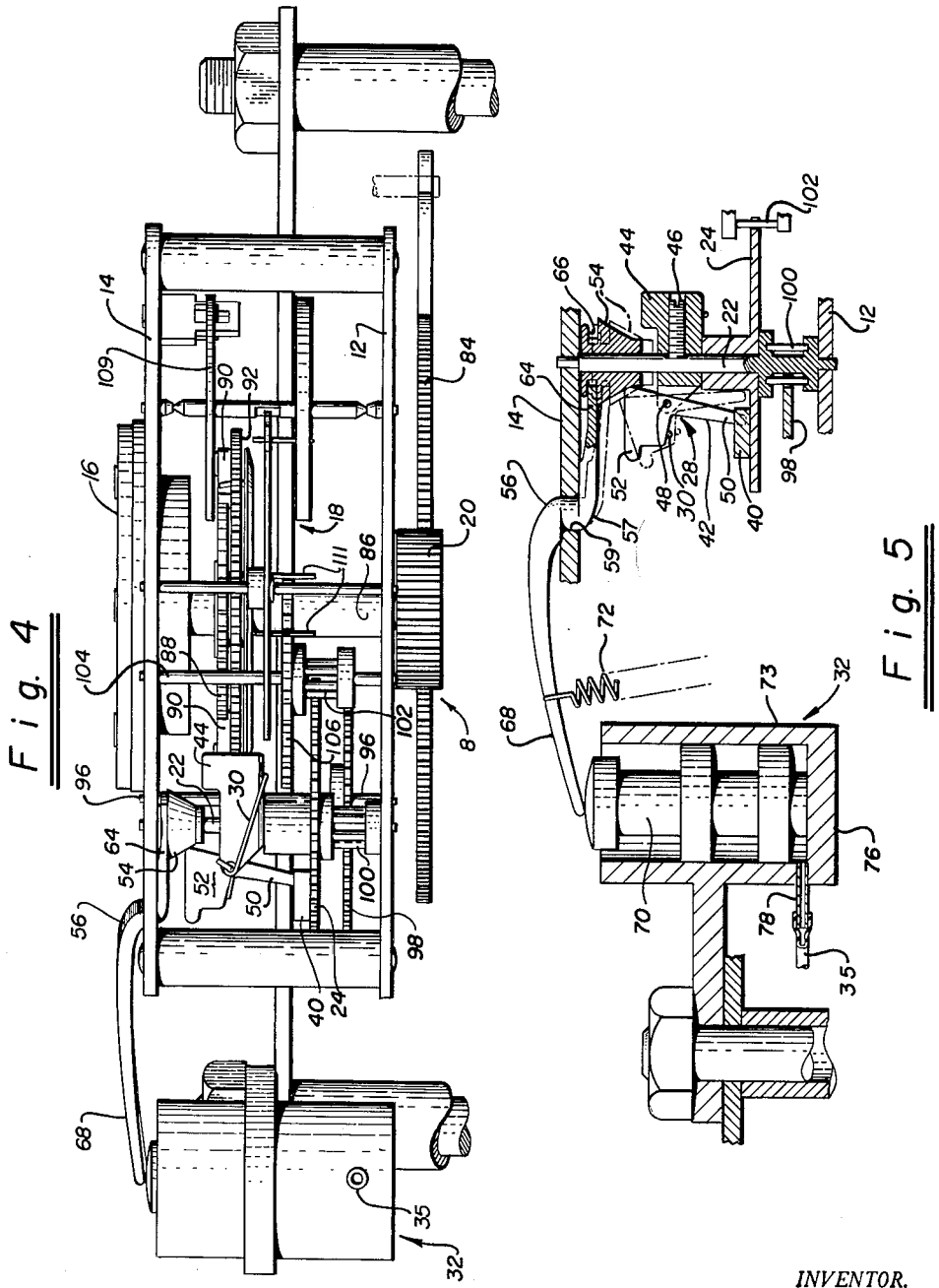
INVENTOR.
Rollin A. Armer

3,064,416
PARKING METER AND TIME RELEASE STRUCTURE THEREFOR

Rollin A. Armer, Berkeley, Calif., assignor, by mesne assignments, to Calpat Products, Inc., a corporation of Nevada
Filed Nov. 12, 1958, Ser. No. 773,503
7 Claims. (Cl. 58—142)

The invention relates to coin operated parking meters for limiting the parking time of an automotive vehicle to the time indicated on the meter, and has special reference to devices for returning the meter to its "zero" position to wipe out any remaining bought time as the vehicle leaves the parking space for which the meter is provided, such as the device disclosed in the companion copending application to myself and John R. Handley entitled "Parking Meter and Time Release Structure Therefor," serial No. 769,889, filed October 27, 1958.

An object of the present invention is to provide a time release structure of the character described which is particularly adapted for use with the style of parking meter known as the "Mi-Co Meter" manufactured by The Michaels Art Bronze Co., Inc., of Covington, Kentucky, and which time release structure is simple in construction, foolproof in operation, rugged in use, dependable in service, and utilizes a low cost mechanism.

Another object of this invention is to provide a sub-assembly which affords a convenient and simple adaptation means for readily converting the "Mi-Co Meter" to operate as a meter of the time cancellation type.

It is a further object of this invention to provide a time release structure which is designed to fail in operating position of the meter whereby if the vehicle leaving the parking area does not actuate the time release, for any reason, the meter will continue to function in normal manner.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawings (4 sheets):

FIGURE 2 is a view similar to FIGURE 1, with parts of the meter removed and portions thereof broken away to show interior construction.

FIGURE 3 is an elevational view looking to the right in the direction of the arrows 3—3 in FIGURE 2.

FIGURE 4 is an elevational view on an enlarged scale looking upwardly in FIGURE 2.

FIGURE 5 is a schematic cross section through the centers of action of associated parts taken substantially along line 5—5 of FIGURE 2.

Figure 1:
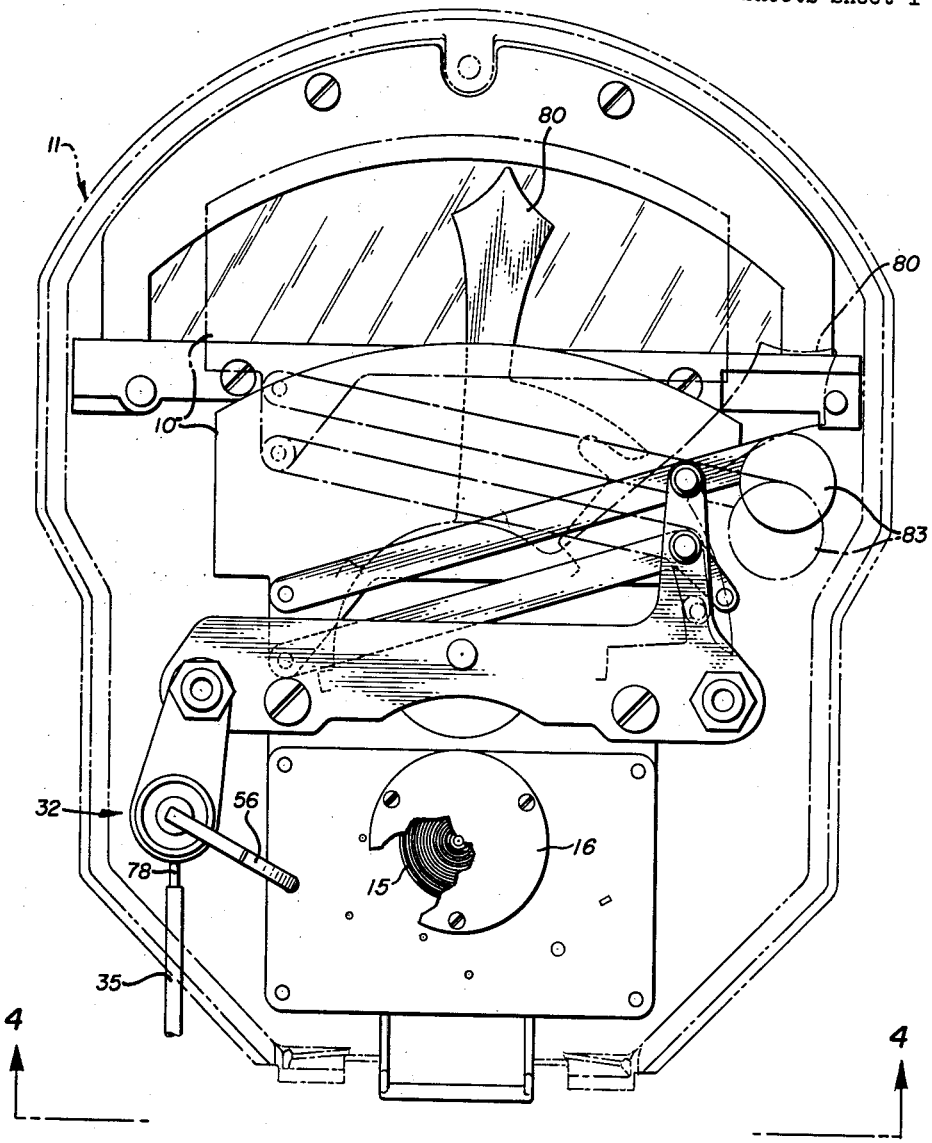
FIGURE 1 is an elevational view looking into the rear of the meter mechanism with the meter mechanism housing shown in dot-dash lines.
Figure 6:
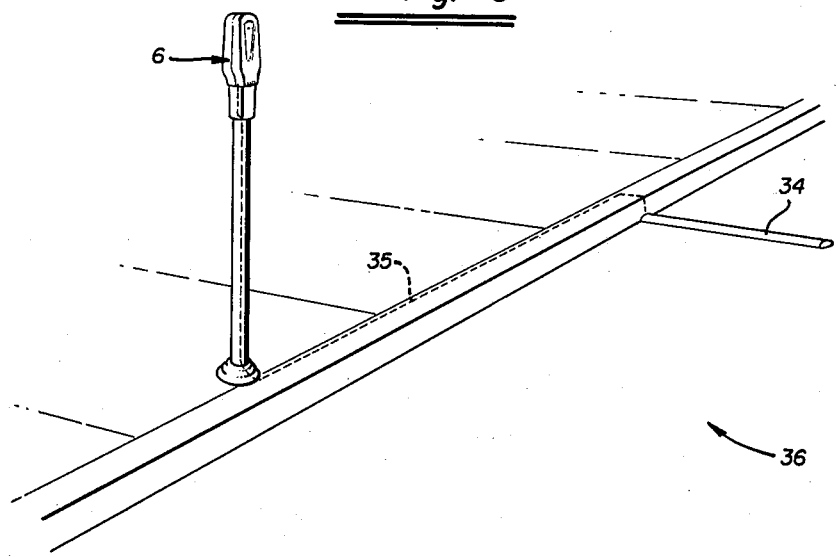
FIGURE 6 is a fragmentary perspective view of a street and curbing therefore in which a parking space has been delineated and for which space the parking meter embodying this invention has been installed.
Figure 7:
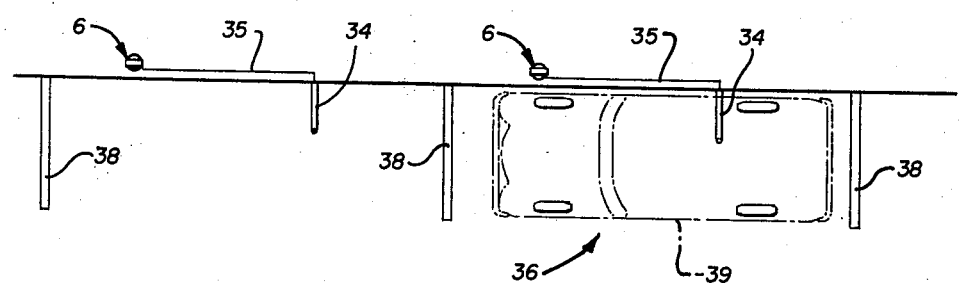
FIGURE 7 is a fragmentary plan view of the area illustrated in FIGURE 6 and shown with an automobile in phantom lines in the parking space.

The parking meter 6 and time release structure therefor of this invention comprises a pointer assembly 8 which is movable to active time indicating and zero inactive positions and associated therewith is violation flag 10 movable to operable and inoperable positions, as shown in the broken and solid line positions respectively in FIGURE 1, and disposed within a two-piece meter mechanism housing 11. A clock mechanism, also contained in the housing 11, includes spaced front and rear cover plates or supports 12 and 14 respectively, a main spring 15 disposed within a case 16 carried by support 14 windable to store energy and drive shaft 86 having one end connected to spring 15 and carrying a driven member (gear 20) providing a driving connection between the main spring and the pointer assembly. Also connected to shaft 86 is a drive train which includes, inter alia, an escapement 18, functioning to impose a restrained timed movement of said pointer assembly 8 to its inactive position and flag 10 from its inoperable to its operable position. Part of the drive train is a shaft 22 journalled at opposite ends in respective supports 12 and 14 and an intermediate gear 24 mounted for rotation thereon and operatively connected to the escapement 18. A coin controlled means 26, upon actuation, winds the main spring 15 to apply a torque on the drive train of the clock mechanism and moves pointer assembly 8 to its active position and flag 10 to its inoperable position. A drive selector mechanism 28 fixedly mounted on shaft 22 has a first position causing the torque applied by the main spring on the drive train to pass through intermediate gear 24 to escapement 18 thereby imparting timed rotation to shaft 22 for effecting timed displacement of the driven member 20 to its terminal position, and has a second position which disengages the escapement and causes the torque to directly drive shaft 22, causing rapid rotation thereof, thereby dissipating the remainder of the stored energy in the main spring and substantially instantaneously moving driven member 20 to its terminal position to immediately return the pointer assembly 8 to its zero position and flag 10 to its operable position. Means provided for normally releasably holding the selector mechanism 28 in its first position is in the form of a wire spring 30 resiliently urging the mechanism to hold in its first position. A pneumatic actuator 32, is operatively connected to the selector mechanism 28 and functions when energized to displace the selector mechanism to its second position. A collapsible air tube 34 is connected through a conduit 35 to actuator 32 and is mounted in a street parking space 36 delineated by lines 38 in position for transversing by a curb wheel of a vehicle 39 upon leaving the parking space to provide an air pulse for energizing the actuator.

A drive block or stop 40 is secured on one face of gear 24 and is spaced outwardly from shaft 22. The selector mechanism 28 includes a drive lever 42 carried by shaft 22 for rotation therewith and for movement in an arcuate path to one side of the shaft into and out of engagement with stop 40, as shown in the respective solid and broken line positions of the lever in FIGURE 5, to correspond to the first and second positions of the selector mechanism respectively.

Drive lever 42 is pivotally mounted intermediate its ends and has a relatively narrow first end 50 providing a finger which is in engagement with stop 40 in the first position of the drive selector mechanism. The other end 52 of lever 42 is weighted by having an enlarged head portion so that this end of the lever is centrifugally thrown upon the rapid rotation of shaft 22 when released by movement of the first end of the lever out of engagement with stop 40 releasing the selector mechanism to displace to its second position. The centrifugal action of the weighted end 52 will retain the first end 50 of the lever out of engagement with stop 40 until the energy remaining in the main spring is dissipated through the rotation of shaft 22.

The time release structure also includes an inverted cone member 54 mounted on shaft 22, adjacent the weighted end 52 of lever 42, for longitudinal reciprocation one the shaft and into camming relation with the weighted end 52 for causing lever 42 to move in its arcuate path out of engagement with stop 40 against the action of the holding means, spring 30, normally urging the lever to engagement with stop 40. An actuating lever 56 is pivotally mounted intermediate its ends on support 14 (as by extending an offset neck 57 through an opening 59 in the end plate 14) and is operatively connected between the pneumatic means 32 and cone member 54 to effect longitudinal displacement of the cone member in one direction to move lever 42 out of engagement with stop 40 upon energization of the pneumatic actuator.

Actuating lever 56 has one end 64 forked to enter a groove 66 provided in cone member 54 to thereby connect the lever 56 to the cone member for effecting its reciprocation. The other end 68 of lever 56 is urged by spring 72 into contact with one end of a piston 70 forming part of the pneumatic actuator. Piston 70 is mounted in a cylinder housing 73 for reciprocation through one end 74 thereof. Movement of piston 70 through the end 74 of the cylinder housing is effected by an air pulse entering the cylinder housing adjacent the opposite closed end 76 thereof behind piston 70 causing lever 56 to rock about its pivot and effect movement of cone member 54 in one direction into camming relation with drive lever 42. The air pulse is directed into the cylinder housing through a pipe 78 carried by and communicating at one end with the interior of the housing and having its other end received in air-right engagement within the end of hose 35 extending from the collapsible air tube in which the air pulse is created.

Spring 72 also urges actuating lever 56 to displace cone member 54, in its reciprocating movement in a second direction away from drive lever 42 thus releasing the latter to assume its first (engaged) position under the action of spring 30.

The drive selector mechanism also includes a mounting member or block 44 fixedly secured to shaft 22 by any suitable means such as set screw 46. The lever 42 is pivotally mounted, as at 48, on member 44 in a transverse slot opening through one end of the mounting member for rotation with the member as shaft 22 rotates.

As previously indicated, meter 6 is the manually coin operated type manufactured by the Michaels Art Bronze Co., Inc. of Covington, Kentucky, and is sold commercially as the "Mi-Co Meter," and is modified as above described to provide the time cancellation function. Meter 6 is placed in operating condition by the insertion of a coin into the coin controlled mechanism 26 and manually turning a handle 27 which causes rotation of shaft 86 and winding of spring 15, pointer assembly 8 to move to an active time indicating position wherein pointer 80 registers the time limit against a curved index scale 82, and releases violation flag 10 associated therewith for movement by weight 83 to its inoperable position shown in solid lines in FIGURE 1. The pointer assembly includes a gear toothed segment 84 meshing with driven member 20 on shaft 86. As the pointer assembly is moved to its active position, segment 84 is rotated to impart rotation to gear 20 fixed at one end of shaft 86 to cause rotation of the shaft which winds the main spring 15 connected to the other end of the shaft. A pawl and ratchet arrangement, see FIG. 2, prevents unwinding of the main spring and consists of a ratchet wheel 88 fixed on shaft 86 for rotation therewith and pawls 90 carried on a gear 92 mounted on shaft 86 for free rotation thereon.

After the main spring has been wound, it places a torque on shaft 86 and the drive train connected thereto tending to displace drive member 20 to its terminal position. Displacement of drive member 20 to its terminal position is accomplished by the torque of the main spring being transmitted through the pawl and ratchet arrangement 88, 90 to gear 92 which engages cage roll 94 fixed on shaft 96. Also fixed on shaft 96 is a gear 98 engaging a cage roll 100 fixed on shaft 22. Intermediate gear 24 is in engagement with a cage roll 102 fixed on shaft 104 upon which is also fixed an escapement gear 106 forming a part of the escapement 18 which imparts timed displacement to cage roll 102 which causes intermediate gear 24 to rotate on shaft 22. Other parts of the escapement seen in FIGURES 2 and 4 include balance wheel 108, hair spring 109 and escapement lever 110 having a pair of spaced pins 111 co-functioning as an escapement ratchet for escapement gear 106. Timed rotation of shaft 22 by the escapement is accomplished by the engagement of drive lever 42 with stop on gear 24 and the timed motion is transmitted from shaft 22 through gear 98, 96, cage roll 94, gear 90 and shaft 86 to effect timed displacement of driven member 20 toward its terminal position. When the drive selector mechanism is displaced to its second position, drive lever 42 moves out of engagement with stop 40 as that shaft 22 is no longer rotated by time displacement of the escapement, but is free to spin rapidly under the direct influence of the main spring torque until the remainder of torque of the spring is dissipated. Rapid rotation of shaft 22 is accompanied by rapid movement of driven member 20 to its terminal position.

In the event of failure of the pneumatic tube or should weather conditions, such as snow or ice, or street debris render the tube ineffective to produce the air pulse required to actuate the time release structure, the escapement will continue to function in normal manner so that the meter will allow the full amount of time on the meter to elapse before violation flag 10 will be moved to its operable position. Of course, under those conditions the departure of a vehicle from the parking area will not actuate the time release structure incorporated into the meter, but the meter will continue to operate as if the time release structure were not present until the conditions preventing actuation of the time release structure is alleviated. Thus, while no additional revenue will be gained during the inoperative periods of the time release structure, the revenue realized from the normal operation of the meter will continue to accrue.

I claim:

1. A parking meter and time release structure therefor comprising, a pointer assembly movable to active time indicating and inactive zero positions, a violation flag associated with said pointer assembly movable to operable and inoperable positions, a clock mechanism including a main spring windable to store energy and having a drive shaft connection to said pointer assembly, a drive train having an escapement being connected to said shaft to effect a restrained timed movement of said pointer assembly to its zero position and said flag from its inoperable to its operable positions, said drive train including a shaft and an intermediate gear mounted for rotation thereon, coin controlled means to wind said spring to apply a torque on said train and to move said pointer mechanism to active position and said flag to inoperable position, a drive selector mechanism mounted on said shaft and having a first position causing said torque to pass through said intermediate gear to said escapement thereby imparting timed rotation to said shaft for timed displacement of said pointer assembly and a second position breaking the connection between said intermediate gear and said escapement thereby rapidly dissipating the remainder of the stored energy in said spring and instantaneously returning said pointer assembly to its zero position and said flag to its operable position, means normally releasably holding said selector mechanism in its first position, and a pneumatic actuator connected to said selector mechanism and functioning when energized to displace said selector mechanism to its second position.

2. A parking meter and time release structure therefor as characterized in claim 1 and wherein a stop is carried by said gear, said selector mechanism including a drive lever carried by said shaft for rotation therewith and for movement in an arcuate path to one side of said shaft into and out of engagement with said stop corresponding to the first and second positions of said selector mechanism.

3. A parking meter and time release structure therefor as characterized in claim 2 wherein said lever is pivoted intermediate its ends and mounted with a first end engageable with said stop, the other end of said lever being weighted and being centrifugally thrown on rapid rotation of said shaft when released in said second position to retain said first end out of engagement with said stop.

4. A parking meter and time release structure therefor as characterized in claim 2 and including an inverted cone member mounted for longitudinal reciprocation on said shaft and into camming engagement with said drive lever for displacement of the latter to said second position against the action of said means normally holding said lever in its first position, and an actuating lever operatively connected between said pneumatic means and said cone member to effect longitudinal displacement of the latter to displace said drive lever upon energizing of said pneumatic means.

5. A parking meter and time release structure therefor comprising, a pointer assembly movable to active time indicating and inactive zero positions, a violation flag associated with said pointer assembly movable to operable and inoperable positions, a clock mechanism including a support and a main spring windable to store energy and a drive shaft connection to said pointer assembly, a drive train having an escapement and being connected to said shaft to effect a restrained timed movement of said pointed assembly to its zero position and said flag from its inoperable to its operable positions, said drive train including a second shaft and an intermidate gear mounted for rotation thereon, coin controlled means to wind said spring to apply a torque on said train and to move said pointer mechanism to active position and said flag to inoperable position, a stop carried by said gear, a mounting member secured to said second shaft for rotation therewith adjacent to said gear, a first lever carried by said mounting member for rotation therewith and at one side of said second shaft for movement to a first position in engagement with said stop causing said torque to be transmitted to said escapement thereby imparting a timed rotation to said second shaft for timed displacement of said pointer assembly, said lever having a second position out of engagement with said stop breaking the connection between said second shaft and escapement thereby releasing said second shaft for rapid dissipation of the remainder of the stored energy in said spring thus substantially instantaneously moving said pointer assembly to its zero position and said flag to its operable position, a first spring normally urging said lever to its first position, said lever being weighted and being centrifugally thrown when said second shaft is released to retain itself out of engagement with said stop against the action of said spring until after said energy is dissipated, an inverted cone member mounted for longitudinal reciprocation on said second shaft and movable in a first direction into camming relation with one end of said lever causing displacement thereof to its second position against the action of said spring, a second lever pivotally mounted on said support and having one end connected to said cone member for effecting reciprocation thereof, a pneumatic actuator carried by said support and connected to the opposite end of said lever and functioning when energized to displace said cone member in said first direction and a spring connected to said second lever to displace said cone member in a second direction away from said first lever.

6. In a parking meter and time release structure therefor having an indicator moveable to time indicating and time expired positions and coin controlled means for displacing said indicator to time indicating position, a clock mechanism adapted for connection to said coin controlled means for initiating operation and having an assembly of entrained spring driven rotating members including a driven member, said clock effecting movement of said indicator to time expired position and said member to a terminal position, said clock mechanism also including an escapement having an operating connection to one of said rotating members and imposing a regulated rate of rotation on said assembly causing a relatively slow timed movement of said driven member to said terminal position, pulse operated means selectively interrupting said connection of said escapement to said rotating member thereby releasing said assembly for rapid movement of said driven member to said terminal position and said indicator to a time expired position, and effecting a relatively high speed rotation of said rotating member, means biasing said last-named means for effecting reengagement of said escapement and rotating member, and centrifugally acting means connected ot said assembly for actuation during said rapid movement and being formed and connected and functioning to maintain said interruption of said connection against the action of said biasing means during the period of said high speed rotation of said rotating member.

7. In a parking meter and time release structure therefor having an indicator moveable to time indicating and time expired positions and coin controlled means for displacing said indicator to time indicating position; a clock mechanism adapted for connection to said coin controlled means for initiating operation and having an assembly of entrained gears including a driven gear adapted to effect movement of said indicator to time expired position, said clock mechanism including an escapement connected to and imposing a regulated rate of rotation on said entrained gears; means for selectively interrupting the drive connection through said entrained gears while keeping said gears inter-engaged at all times comprising a shaft having one of said gears fixed thereto for joint rotation, a second of said gears carried by said shaft for free rotation thereon, and clutch means connected to said second gear and shaft and having first and second positions locking and unlocking said second gear to and from said shaft for joint and independent rotation respectively, means biasing said clutch means to said first position, and pulse operated means connected for displacement of said clutch means to said second position against the resistance of said biasing means.

References Cited in the file of this patent
UNITED STATES PATENTS

| Re. 23,338 | Burton | Feb. 13, 1951 |
| 2,096,155 | Breeden | Oct. 19, 1937 |
| 2,311,242 | Michaels | Feb. 16, 1943 |
| 2,546,433 | Dick | Mar. 27, 1951 |
| 2,945,341 | Griffin et al. | July 19, 1960 |